United States Patent
Medasani et al.

(10) Patent No.: US 10,607,326 B2
(45) Date of Patent: Mar. 31, 2020

(54) AUTOMATED SYSTEM AND METHOD OF RETAINING IMAGES BASED ON A USER'S FEEDBACK ON IMAGE QUALITY

(71) Applicant: Uurmi Systems PVT. LTD., Hyderabad (IN)

(72) Inventors: Shanti Swarup Medasani, Hyderabad (IN); Sumohana S Channappayya, Hyderabad (IN); Venkatanath Neeluri, Hyderabad (IN); Maruthi Chandrasekhar Bhatlapenumarti, Hyderabad (IN)

(73) Assignee: Uurmi Systems PVT LTD, Hyderabad (IN)

( * ) Notice: Subject to any disclaimer, the term of this patent is extended or adjusted under 35 U.S.C. 154(b) by 31 days.

(21) Appl. No.: 15/726,374

(22) Filed: Oct. 5, 2017

(65) Prior Publication Data
US 2019/0108627 A1    Apr. 11, 2019

(51) Int. Cl.
*G06K 9/00*     (2006.01)
*G06T 5/50*     (2006.01)
(Continued)

(52) U.S. Cl.
CPC .............. *G06T 5/50* (2013.01); *G06F 3/0484* (2013.01); *G06F 16/58* (2019.01); *G06F 16/583* (2019.01); *G06F 17/10* (2013.01); *G06K 9/6228* (2013.01); *G06K 9/6263* (2013.01); *G06T 7/0002* (2013.01); *G06T 7/41* (2017.01); *G06T 2207/10004* (2013.01);
(Continued)

(58) Field of Classification Search
None
See application file for complete search history.

(56) References Cited

U.S. PATENT DOCUMENTS 5,774,230 A    6/1998  Goto
8,370,282 B1   2/2013  Leung et al.
(Continued)

OTHER PUBLICATIONS

Chen et al., "A user-controlled assessment approach to perceptual quality in autostereoscopic displays for mobile gaming", Dec. 2015, pp. 3.

(Continued)

*Primary Examiner* — Hadi Akhavannik
(74) *Attorney, Agent, or Firm* — Benjamin Balser; Next ip Law Group

(57) ABSTRACT

An automated system and method for retaining images in a smart phone are disclosed. The system may then determine a no-reference quality score of the image using a PIQUE module. The PIQUE module utilizes block level features of the image to determine the no-reference quality score. The system may present the image and the no-reference quality score to the user and accept a feedback towards quality of the image. The system may utilize a supervised learning model for continually learning a user's perception of quality of the image, the no-reference quality score determined by the PIQUE module, and the user feedback. Based on the learning, the supervised learning model may adapt the no-reference quality score and successively the image may either be retained or isolated for deletion, based on the adapted quality score and a predefined threshold range.

19 Claims, 6 Drawing Sheets

(51) Int. Cl.
*G06F 17/10* (2006.01)
*G06K 9/62* (2006.01)
*G06F 3/0484* (2013.01)
*G06F 16/583* (2019.01)
*G06T 7/41* (2017.01)
*G06T 7/00* (2017.01)
*G06F 16/58* (2019.01)

(52) U.S. Cl.
CPC ............... *G06T 2207/20021* (2013.01); *G06T 2207/20081* (2013.01); *G06T 2207/30168* (2013.01)

(56) References Cited

U.S. PATENT DOCUMENTS

| | | | |
|---|---|---|---|
| 8,433,137 B2 | 4/2013 | Liu et al. | |
| 2012/0281924 A1* | 11/2012 | Coulombe | H04N 19/85 382/218 |
| 2015/0189166 A1 | 7/2015 | San Pedro Wandelmer | |
| 2017/0013191 A1* | 1/2017 | Saad | H04N 5/23222 |

OTHER PUBLICATIONS

Li et al., "Discriminative Multi-View Interactive Image Re-Ranking", Jan. 10, 2017, pp. 3113-3127.
Guo et al., "Learning similarity measure for natural image retrieval with relevance feedback", Nov. 7, 2002, pp. 811-820.

\* cited by examiner

AUTOMATED SYSTEM AND METHOD OF RETAINING IMAGES BASED ON A USER'S FEEDBACK ON IMAGE QUALITY

FIELD OF THE DISCLOSURE

The presently disclosed embodiments are generally related to power image storage based on quality of the image and more particularly to image storage based on a user's perception of image quality.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Today's smart phone includes a high resolution camera having a fast image capturing capability. Thus, it is easy to capture a large number of images within seconds. Many of the smart phones provide a burst mode for capturing multiple images consecutively at a fast rate. While a large number of images of a scene are captured quickly, a few or many of those images may not get captured properly. Some images may comprise noise and the object of interest may be blurred.

It requires a lot a computation to process these images for separating images of good quality from images of poor quality. Such computation becomes complex especially when a large number of images need to be processed. The smart phones also provide automated best shot selection from the burst of images. The automated best shot selection may depend on factors such as lighting conditions, contrast, image resolution, dynamic range, and colour rendering.

The automated best shot selection may work only on images of burst shots and not on images captured generally. Further, the images of good quality, identified by the smart phone, may not be adequate from a user's perspective of image quality. Thus, it is important to understand a user's opinion of image quality for segregating all the images stored on his smart phone.

BRIEF SUMMARY

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method of retaining images based on a user's feedback on image quality is described. The method comprises receiving an image from either a camera or an archive of images. The method further comprises of determining a no-reference quality score of the image based on weights of blocks of the image. The weights of the blocks may be determined based on features of the image. The method further comprises presenting at least one of the image, the no-reference quality score, and a spatial quality map of the image, to the user. The method further comprises accepting a user feedback towards validation of the no-reference quality score of the image. The method further comprises continually learning user's perception of quality of the image based on processing of the image, the no-reference quality score determined by the PIQUE module, and the user feedback. The method further comprises retaining the image while the no-reference quality score of the image lies between a predefined threshold range, else isolating the image for deletion.

In an example embodiment, a system for retaining images based on a user's feedback on image quality is described. The system comprises a processor to receive images from either a camera or an archive of images. The system may further determine a no-reference quality score of the image based on weights of blocks of the image. The weights of the blocks may be determined based on features of the image. The system may further present at least one of the image, the no-reference quality score, and a spatial quality map of the image, to the user. The system may further accept a user feedback towards validation of the no-reference quality score of the image. The system may further continually learn a user's perception of quality of the image based on processing of the image, the no-reference quality score determined by the PIQUE module, and the user feedback. The system may further retain the image while the no-reference quality score of the image lies between a predefined threshold range, else may isolate the image for deletion.

In an example embodiment, a non-transitory computer readable medium embodying a program executable in a computing device for retaining images based on a user's feedback on image quality is described. The program may comprise a program code for receiving an image from one of a camera and an archive of images. The program may further comprise a program code for determining a no-reference quality score of the image based on weights of blocks of the image. The weights of the blocks may be determined based on features of the image. The program may further comprise a program code for presenting at least one of the image, the no-reference quality score, and a spatial quality map of the image, to the user. The program may further comprise a program code for accepting a user feedback towards validation of the no-reference quality score of the image. The program may further comprise a program code for continually learning user's perception of quality of the image based on processing of the image, the no-reference quality score determined by the PIQUE module, and the user feedback. The program may further comprise a program code for retaining the image while the no-reference quality score of the image lies between a predefined threshold range, else isolating the image for deletion.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Unless specifically stated otherwise, as apparent from the following discussion, it is appreciated that throughout this specification discussions utilizing terms such as "receiving," "determining," "presenting," "learning," "retaining," or the like refer to the actions or processes that may be performed by a computing platform, such as a computer or a similar electronic computing device, that is operable to manipulate or transform data represented as physical, electronic or magnetic quantities or other physical quantities within the computing platform's processors, memories, registers, or other information storage, transmission, reception or display devices. Accordingly, a computing platform refers to a system or a device that includes the ability to process or store data in the form of signals. Thus, a computing platform, in this context, may comprise hardware, software, firmware or any combination thereof. Further, unless specifically stated otherwise, a process as described herein, with reference to flowcharts or otherwise, may also be executed or controlled, in whole or in part, by a computing platform.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is an object of the current disclosure to provide a system, method and device that enables retention of images based on a user's feedback on image quality and user's perceptual preferences.

Figure 1:
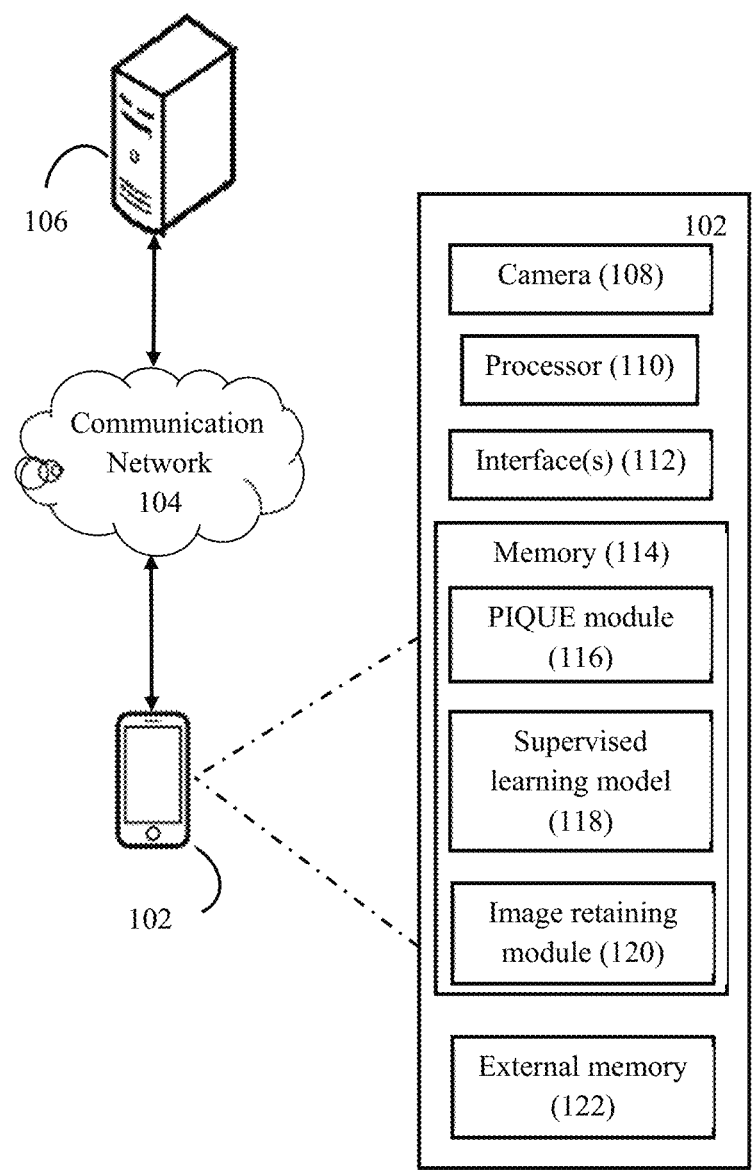
FIG. 1 illustrates a network connection diagram 100 of a system 102 for retaining images based on a user's feedback on image quality, in accordance with an embodiment of present disclosure.

FIG. 1 illustrates a network connection diagram 100 of a system 102 for storing images based on a user's feedback on image quality, in accordance with an embodiment of present disclosure. The system 102 is generally implemented on a smart phone as illustrated in FIG. 1, but could also be implemented on a remote server 106 of FIG. 1. The smart phone 102 may be connected to the remote server 106 through a communication network 104. The communication network 104 connecting the smart phone and the remote server 106 may be essentially implemented using IEEE 802.11 standard. Further, the communication network may use other communication techniques for achieving connectivity between different units or modules. The other communication techniques may be selected from Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), and Radio waves.

The system 102 comprises a camera 108 and a processor 110. The processor 110 may execute computer program instructions stored in a memory 114. The memory 114 may refer to an internal memory of the system 102. The processor 110 may also be configured to decode and execute any instructions received from one or more other electronic devices or one or more remote servers. The processor 110 may include one or more general purpose processors (e.g., ARM®, INTEL®, and NVIDIA® microprocessors) and/or one or more special purpose processors (e.g., digital signal processors or Xilinx System On Chip (SOC) Field Programmable Gate Array (FPGA) processor). The processor 110 may be configured to execute one or more computer-readable program instructions, such as program instructions to carry out any of the functions described in this description.

Interface(s) 112 may be used to interact with or program the system 102 to achieve desired functionality. The interface(s) 112 may either be Command Line Interface (CLI) or Graphical User Interface (GUI). The interface(s) 112 may also be used for accepting user feedbacks and inputs.

The memory 114 may include a computer readable medium. A computer readable medium may include volatile and/or non-volatile storage components, such as optical, magnetic, organic or other memory or disc storage, which may be integrated in whole or in part with a processor, such as processor 110. Alternatively, the entire computer readable medium may be remote from processor 110 and coupled to processor 110 by connection mechanism and/or network cable. In addition to memory 114, there may be additional memories that may be coupled with the processor 110. The memory 114 may comprise a Perception based Image Quality Evaluator (PIQUE) module 116, a supervised learning model 118, and an image retaining module 120.

In one embodiment, the processor 110 may receive an image. In one case, the image may be received from the camera 108 of the smart phone 102 using a frame grabber.

By the frame grabber, a frame capture request may be sent to Hardware Abstraction Layer (HAL) of the camera 108. Successively, an image captured by the camera 108 may be received in a buffer and may be delivered to the processor 110 at a fixed frame rate. Alternatively, the image may be retrieved from the memory 114 of the smart phone 102. Further, the processor 114 may receive multiple images for parallel processing, from the memory 114 of the smart phone 102.

In one embodiment, the images may be stored in an external memory 122 connected to the smart phone 102. The external memory 122 may be present as a Secure Digital (SD) card, or micro SD card, or Universal Serial Bus (USB) flash drive. The external memory 122 may either be volatile or non-volatile in nature.

In one embodiment, the images may be stored on a server 106. The images captured by the smart phone 102 may continuously be updated or transferred to the server 102. The server 102 may indicate a cloud storage facility offered by an Internet Service Provider (ISP) or a telecommunication service provider. For example, the images captured on an i-Phone™ are stored over iCloud™ network.

Successively, the image may be transferred to the Perception based Image Quality Evaluator (PIQUE) module 116 for further processing. The PIQUE module 116 may function to determine a no-reference quality score of the image. In order to determine the no-reference quality score, the PIQUE module 116 may pre-process the image, at a first stage. The image may be present in different colour formats such as RGB, YUV, and YIQ. The image may be pre-processed for colour conversion. The image may be converted from an existing colour format into a gray scale image.

At a second stage, during pre-processing, the image may be divisively normalized. Divisive normalization of the image helps in accurate capturing of edge information of the image. In one case, transformed luminance values may be identified as Mean Subtracted Contrast Normalized (MSCN) coefficients for the image I(i, j) using a below mentioned equation 1.

$$\hat{I}(i, j) = \frac{I(i, j) - \mu(i, j)}{V(i, j) + C} \quad \text{Equation 1}$$

In above equation 1, i and j are spatial indices and i∈1, 2 . . . M and j∈1, 2 . . . N. M and N are image height and width respectively. μ(i,j) denotes local mean in the image. V(i,j) denotes variance in the image. 'C' is a constant set to a pre-defined non-zero value to prevent instability of the MSCN coefficient values. For example, in one case, the constant 'C' is not used and details of an image of clear sky are processed to determine an MSCN coefficient value. All the pixels of such image may have uniform values and a value of the variance may be '0.' The denominator may have a value of '0' in such case. As the denominator has the value '0,' the MSCN coefficient value may become unstable. To prevent such instability, the constant 'C' is used. In one case, 'C' is set as 1.

In above mentioned equation 1, $$\mu(i, j) = \sum_{k=-K}^{K} \sum_{l=-L}^{L} w_{k,l} I_{k,l}(i, j) \quad \text{Equation 2}$$

-continued $$V(i, j) = \sqrt{\sum_{k=-K}^{K} \sum_{l=-L}^{L} w_{k,l} (I_{k,l}(i, j) - \mu(i, j))^2} \quad \text{Equation 3}$$

In above mentioned equations 2 and 3, w={$w_{k,l}$|k=−K, . . . K, l=−L, . . . L} is a 2D-circularly symmetric Gaussian weighting function sampled out to 3 standard deviations (K=L=3) and rescaled to a unit volume. Thus, based on the above described processing, a divisive normalized image is obtained. In the divisive normalized image, pixels are mean subtracted and contrast is normalized.

At a second stage in the PIQUE module 116, feature extraction and block classification of the divisive normalized image may be performed to determine feature vector for each block of the image, where a block represents an array of pixels in the image. The image may be scanned in a block-wise manner i.e. scanning block 1 at first and subsequently scanning block 2, block 3, and other blocks in a sequence. In one case, the block size may be (n×n) with n=16, and 'n' denotes a number of pixels in the image. Features for each block of the image may be extracted. The features may comprise derivatives of standard deviation of edge segments of divisively normalized images. Based on the extracted features, each block may be classified as either a distorted block or an undistorted block.

Figure 2:
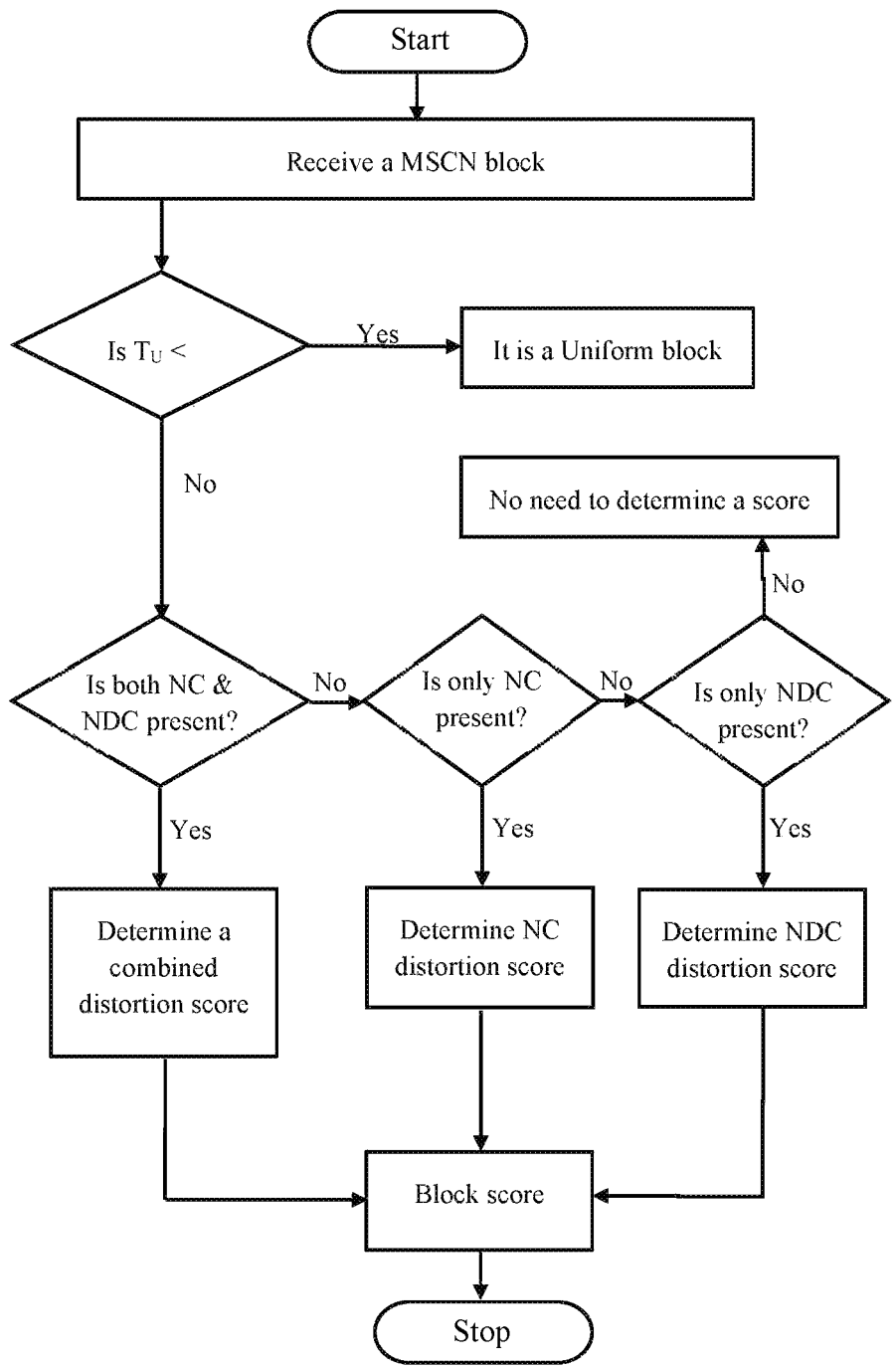
FIG. 2 illustrates a methodology for block level distortion classification and quantification for estimating a block score.

In one embodiment, during block classification, the MSCN coefficients of the image may be utilized to label a block either as a uniform (U) block or a spatially active block. Further, spatially active blocks are analysed for two types of distortion criteria, namely Noticeable Distortion Criterion (NDC) and Additive White Noise Criterion (NC). Detailed explanation related to these criteria is provided henceforth. Once a given block is determined to be a distorted block, weight is subsequently assigned to the distorted block, depending on the amount of distortion contributed by that block to the overall score. Derivation of these weights is explained henceforth with reference to FIG. 2. FIG. 2 shows a methodology for block level distortion classification and quantification for estimating a block score.

In one embodiment, during feature extraction and block classification, the divisive normalized image may be segmented into non-overlapping blocks. In one case, the divisive normalized image may be segmented into blocks $B_k$ of size 'n×n.' In one case, blocks present at the divisive normalized image boundaries on all four sides may be discarded. The MSCN coefficients of the image may be utilized to label a block either as a uniform (U) block or a non-uniform block. The non-uniform block may also be identified as a spatially active (SA) block. The criterion for labelling the blocks is as provided below using equation 4.

$$B_k = \begin{cases} U, & v_k < T_U \\ SA, & v_k \geq T_U \end{cases} \quad \text{Equation 4}$$

In above mentioned equation 4, $v_k$ is variance of the coefficients, Î(i,j) in a given block $B_k$ with k∈1, 2, . . . NB. NB defines a total number of blocks of size 'n×n.' In one implementation, n=16 may be used. $T_U$ denotes a predetermined threshold, and based on empirical observations, value of $T_U$ may be set as 0.1, in one case.

Figure 3A:
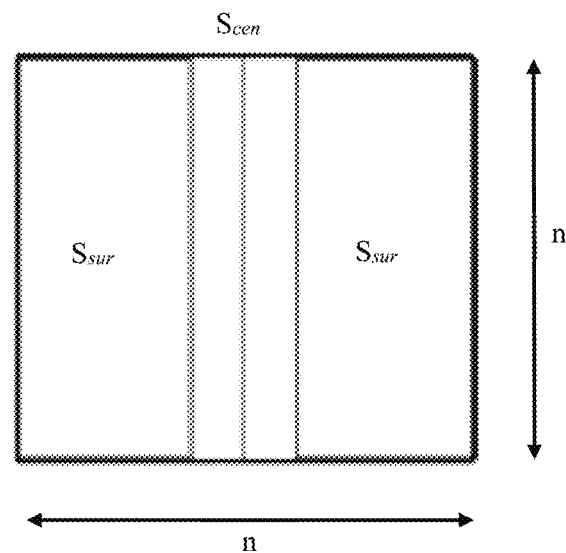
FIG. 3a illustrates segment pattern of a block of an image, used for determining the noise content present in the image, according to an example embodiment.
Figure 3B:
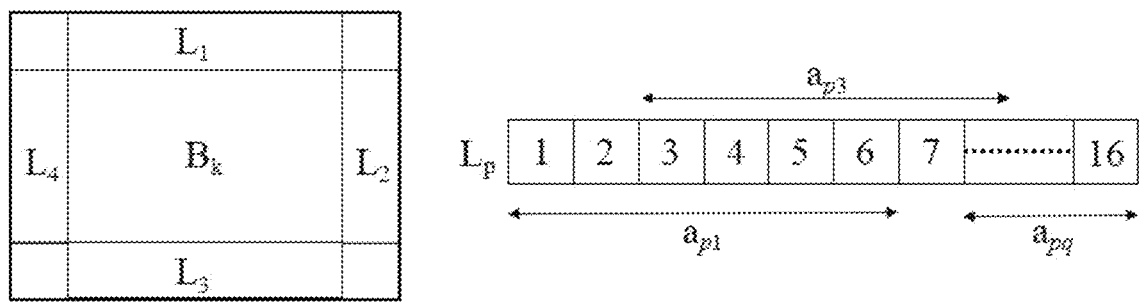
FIG. 3b illustrates the segment pattern of a block of an image, used for determining noticeable distortions like blockiness and smoothness content present in the image, according to an example embodiment.

The identified spatially active blocks, $B_k$ may be analysed for presence of a Noticeable Distortion Criterion (NDC) and an additive white Noise Criterion (NC). A distorted block may then be assigned a distortion score based on the type of distortion present in the distorted block. A block level distortion may be noticeable while at least one of the edge segment exhibits a low spatial activity (Noticeable Distortion Criterion, NDC). A segment may be defined as a collection of 6 contiguous pixels in a block edge as shown in FIG. 3b. For a spatially active block $B_k$ derived from $Î(i,j)$ of size 'n×n' with n=16, each edge '$L_p$' may be divided into eleven segments as mentioned below, in equation 5.

$$a_{pq}=L_p(x):x=q,q+1,q+2,\ldots q+5,\qquad \text{Equation 5}$$

In above mentioned equation 5, $a_{pq}$ denotes the structuring element, p∈1, 2, 3, 4 denotes edge index, and q∈1, 2, 3, . . . 11 denotes the segment index.

A segment may exhibit low spatial activity while a standard deviation ($\sigma_{pq}$) of the segment remains lesser than a threshold $T_{STD}$, as mentioned below in equation 5.

$$\sigma_{pq}<T_{STD}\qquad \text{Equation 6}$$

To avoid difficulty in threshold determination while using luminance images, MSCN coefficients may be used in an embodiment. Usage of the MSCN coefficients may help in significantly reducing threshold variability. The empirical threshold for $T_{STD}$ may be set as 0.1, in one case. Successively, a block may be considered as distorted while at least one of its segments satisfies the above mentioned equation 6. The following sub-section explains the criterion used to classify and estimate noise in a given block.

In one embodiment, perception based center-surround criterion may be considered to model noise distortion using block level MSCN features. Such criterion may be related to Human Visual System's (HVS) sensitivity to center-surround variations. A block may be divided into two segments, as shown in FIG. 3a. The two segments may comprise a central segment comprising two center columns ($S_{cen}$) and a surrounding segment ($S_{sur}$) comprising remaining columns.

In one embodiment, a relation between center-surround deviation ratio and the block standard deviation of an MSCN block may be modelled using parameter 'β' defined using below mentioned equation 7.

$$\beta = \frac{|(\sigma_{cen}/\sigma_{sur})-\sigma_{blk}|}{\max((\sigma_{cen}/\sigma_{sur}),\sigma_{blk})}\qquad \text{Equation 7}$$

In above mentioned equation 7, $\sigma_{cen}$ denotes the standard deviation of a segment $S_{cen}$, $\sigma_{sur}$ is the standard deviation of segment $S_{sur}$, and $\sigma_{blk}$ is the standard deviation of spatially active block $B_k$ derived from $Î(i,j)$. Thus, a block $B_k$ may be identified as being affected with noise while it satisfies the condition (Noise Criterion, NC) provided in below mentioned equation 8.

$$\sigma_{blk}>2*\beta\qquad \text{Equation 8}$$

At a third stage of pre-processing, the computed scores may be pooled. For score pooling, an amount of distortion contributed by a distorted block to an overall score may be determined. In one case, variance ($v_{blk}$) of the MSCN coefficients of a given block may represent significant signature of an amount of distortion present in that block. A distortion assignment procedure may be defined for a given block $B_k$, using a below mentioned equation 9.

$$D_{sk} = \begin{cases} 1 & \text{if (6) \& (8)} \\ v_{blk} & \text{if (8)} \\ (1-v_{blk}) & \text{if (6)} \end{cases}\qquad \text{Equation 9}$$

In above mentioned equation 9, $D_{sk}$ is distortion assigned to a block. Finally, the PIQUE module 116 pools the weights of distorted blocks to determine a no-reference quality score for the image based on a below mentioned equation 10.

$$\text{PIQUE} = \left[\left(\sum_{k=0}^{N_{SA}}(D_{sk})\right)+C1/(C1+N_{SA})\right]\qquad \text{Equation 10}$$

In above mentioned equation 10, '$N_{SA}$' denotes the number of spatially active blocks in the image. Value of $D_{sk}$ may not exceed 1 in any case, and thus the PIQUE score i.e. the no-reference quality score may range between 0 and 1. 'C1' indicates a pre-defined constant having anon-zero value. 'C1' may prevent instability of the PIQUE score while the denominator ($N_{SA}$) has a '0' value.

Figure 4A:
FIG. 4a illustrates an image processed by the system 102, according to an example embodiment.
Figure 4B:
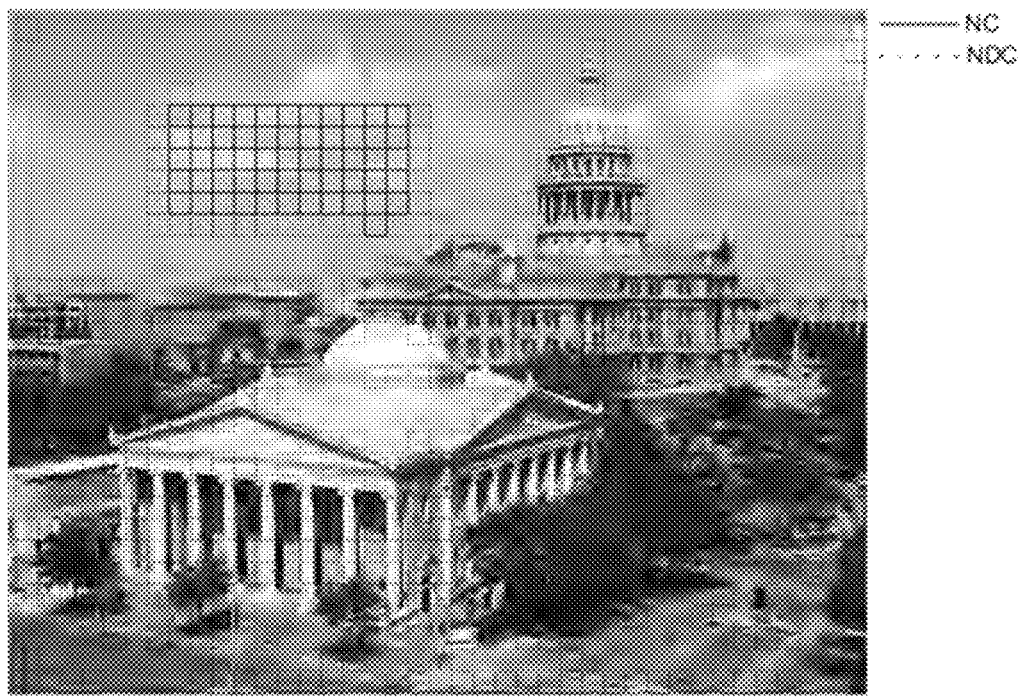
FIG. 4b illustrates a spatial quality map generated by the system 102 for the image shown in FIG. 4a, according to an example embodiment.

In one embodiment, the PIQUE module 116 may generate a spatial quality map for the image. The spatial quality map may help a user in identifying noise or distortion present in each block of the image. FIG. 4b illustrates a spatial quality map of a JP2K (JPEG 2000) Distorted Image from LIVE Database with added Additive White Gaussian Noise (AWGN) noise patches, as illustrated in FIG. 4a. In one case, different colours of the blocks may be used for identifying the blocks corresponding to Noticeable Distortion Criterion (NDC), Noise Criterion (NC), and uniform block (U) criterions. In another case, as shown in FIG. 4b, the block having solid line borders represent NC and the blocks having dotted line borders represent NDC.

The no-reference quality score generated by the PIQUE module 116 may be provided to the image retaining module 120. The image retaining module 120 may retain the image while the no-reference quality score of the image lies between a predefined threshold range, else the image may be isolated for deletion. In one case, the predefined threshold range of 0-0.3 may indicate a good quality of the image and may result in retention of the image. No-reference quality score for the image, ranging from 0.3-0.5 in one case, may indicate an average quality of the image. Such image of average quality may be retained in the memory, isolated into a different memory location for deletion, or deleted based on a user input. No-reference quality score for the image, ranging from 0.5-1 in one case, may indicate poor quality of the image. Such image of poor quality may either be isolated into a different memory location for deletion or may be deleted based on set user preferences.

In one embodiment, the system may be provided with the learning capability by integrating the system 102 with a supervised learning model 118. The supervised learning 118 model may be configured to continuously learn user's perception of quality of the image. To learn the user's perception of quality of the image, the supervised learning model 118 may receive a user feedback towards quality of an image. Successively, the supervised learning model 118 may process the image, the no-reference quality score determined by the PIQUE module 116, and a user feedback towards quality of the image.

Figure 5:
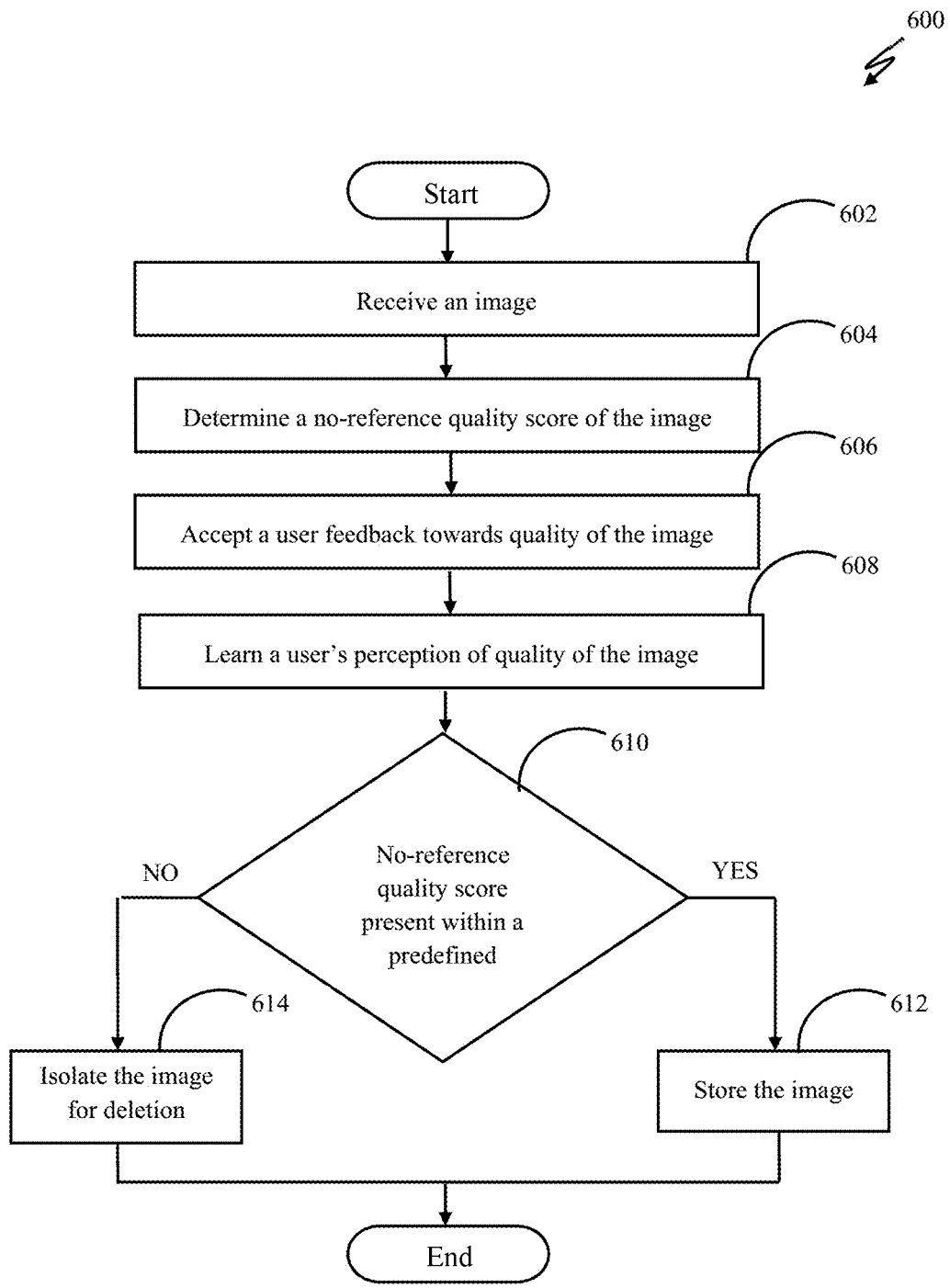
FIG. 5 illustrates a user interface 500 of the system 102 for accepting a user feedback towards quality of an image, according to an example embodiment.

In one embodiment, the user feedback may be a score ranging from 1 to 5. The score may be provided to the system 102 as a star rating using the interface(s) 112, as illustrated in FIG. 5. Further, the user may refer to the spatial quality map of the image to provide the user feedback on quality of the image.

In another embodiment, the supervised learning model 118 may incrementally learn the user's perceptual preferences towards quality of the images, based on training data. The training data may comprise user's feedbacks towards quality of a plurality of images presented to the user, over a period of time. The user may be asked for user feedbacks on image quality of recently captured images or images stored in the memory 114 of the smart phone 102.

In one embodiment, the user feedback may be accepted while the smart phone 102 enters into an active mode from an idle mode i.e. the user unlocks the smart phone 102. The supervised learning model 118 may thus continually learn from the user's feedbacks on the quality of images present in the system and may affect the no-reference quality score based on the user's feedbacks. Successively, the image retaining module 120 may retain the images based on the new no-reference quality scores generated for the images, based on the user's feedback on the quality of images.

In one embodiment, the supervised learning model 118 may comprise a periodic recalibration engine. The periodic recalibration engine may monitor deviations from the user's perception of image quality and errors introduced during the continuous learning process. This periodic recalibration engine may work as a self correction mechanism during the learning process. In case of identification of the deviation between the no-reference quality score and the user's perception of image quality, the periodic recalibration engine may start accepting user feedbacks for tuning the no-reference score as per the user's perception of image quality.

The test results showing performance of the PIQUE module 116 on different publicly available databases having human subjective scores are as provided below. Correlation scores Spearman Rank Order Correlation Coefficient (SROCC) and Pearson Correlation Coefficient (PCC) of the PIQUE module generated on LIVE database are as mentioned below.

| Correlation score | JP2K | JPEG | WN | GBLUR | ALL |
|---|---|---|---|---|---|
| SROCC | 0.93 | 0.89 | 0.96 | 0.92 | 0.91 |
| PCC | 0.93 | 0.90 | 0.94 | 0.90 | 0.90 |

Correlation scores SROCC and PCC of the PIQUE module generated on CSIQ database are as mentioned below.

| Correlation score | JP2K | JPEG | WN | GBLUR | ALL |
|---|---|---|---|---|---|
| SROCC | 0.87 | 0.86 | 0.91 | 0.86 | 0.84 |
| PCC | 0.90 | 0.88 | 0.93 | 0.88 | 0.87 |

Correlation scores SROCC and PCC of the PIQUE module generated on TID database are as mentioned below.

| Correlation score | JP2K | JPEG | WN | GBLUR | ALL |
|---|---|---|---|---|---|
| SROCC | 0.93 | 0.83 | 0.78 | 0.85 | 0.85 |
| PCC | 0.93 | 0.87 | 0.78 | 0.84 | 0.86 |

Figure 6:
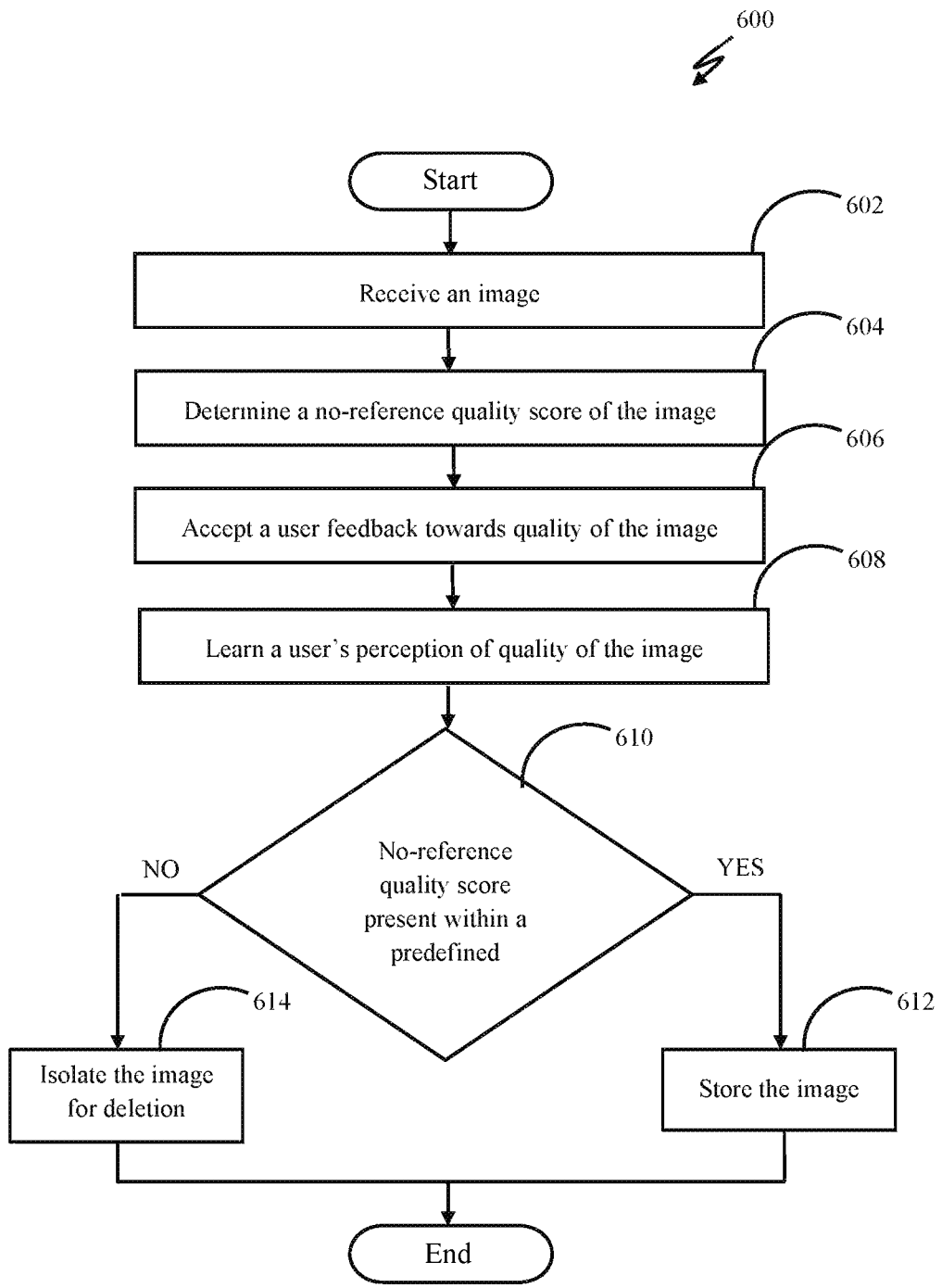
FIG. 6 illustrates a flow chart showing a method 600 of retaining images based on a user's feedback on image quality.

FIG. 6 illustrates a flowchart of a method of retaining images based on a user's feedback on image quality, according to an embodiment. FIG. 6 comprises a flowchart 600 that is explained in conjunction with the elements disclosed in FIG. 1.

The flow chart of FIG. 6 show the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 600 starts at the step 602 and proceeds to step 614.

At step 602, an image is received from one of a camera or an archive of images. In one embodiment, the image may be received by a processor 110.

At step 604, a no-reference quality score of the image may be determined. In one embodiment, the no-reference quality score of the image may be determined by a Perception based Image Quality Evaluator (PIQUE) module 116.

At step 606, a user feedback towards quality of the image may be accepted. In one embodiment, the user feedback may be accepted by the processor 110. In one case, the user feedback may be accepted while the smart phone 102 is unlocked by the user. Further, the user feedback may be accepted in different ways and during different instances.

At step 608, a user's perception of a quality of image may be learnt. In one embodiment, the user's perception of quality of image may be learnt by a supervised learning model 118.

At step 610, the no-reference quality score may be checked to be present within a predefined threshold range. In one embodiment, the no-reference quality score may be checked by the processor 110.

At step 612, the image may be retained in the memory while the no-reference quality score is present within the predefined threshold range. In one embodiment, the image may be retained by an image retaining module 120.

At step 614, the image may be isolated for deletion while the no-reference quality score of the image is not present within the predefined threshold range. In one embodiment, the image may be isolated for deletion by the image retaining module 120.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An automated method of retaining images based on a user's feedback on image quality, the method comprising:
   receiving, by a processor, an image from one of a camera and an archive of images;
   determining, by the processor, a no-reference quality score of the image based on weights of blocks of the image, wherein the weights of the blocks are determined based on features of the image;
   presenting, by an interface, at least one of the image, the no-reference quality score, or a spatial quality map of the image, to the user;
   receiving, by the processor, a user feedback towards validation of the no-reference quality score of the image;
   continually learning, by a learning model, user's perception of quality of the image based on processing of the image, the no-reference quality score, and the user feedback;
   adjusting, by the processor, the no-reference quality score based on the user's perception of the quality of the image;
   monitoring, by the processor, deviations from the user's perception of the quality of the image and errors introduced during the continuous learning; and
   retaining, by the processor, the image while the no-reference quality score of the image lies between a predefined threshold range, else isolating the image for not to be retained.

2. The method of claim 1, wherein the no-reference quality score is determined while the processor is present in an idle mode.

3. The method of claim 1, wherein the no-reference quality score is determined by a Perception based Image Quality Evaluator (PIQUE) module using the relation, $$\text{Quality Score} = \left[\left(\sum_{k=0}^{N_{SA}} (D_{sk})\right) + C1/(C1 + N_{SA})\right],$$

wherein $D_{sk}$ is distortion assigned to a block of the image, $N_{SA}$ is number of spatially active blocks of the image.

4. The method of claim 1, wherein the no-reference quality score ranges from 0 to 1.

5. The method of claim 1, wherein the features comprise derivatives of standard deviation of edge segments of divisively normalized images.

6. The method of claim 1, wherein the user feedback is accepted while a system used for retaining the image enters into an active mode from an idle mode.

7. The method of claim 1, wherein the user feedback is a score ranging from 1 to 5.

8. The method of claim 1, wherein the learning model continually learns the user's perception of the quality of the image based on training data generated from user's feedbacks towards quality of a plurality of images comprising dissimilar data content.

9. The method of claim 1, wherein the spatial quality map illustrates at least one of an amount and type of distortion present in the blocks of the image.

10. A system for retaining images based on a user's feedback on image quality, the system comprising:
    a processor;
    a camera; and
    a memory coupled to the processor, wherein the processor executes an algorithm stored in the memory to:
       receive, an image from one of the camera and an archive of images;
       determine, using a Perception based Image Quality Evaluator (PIQUE) module, a no-reference quality score of the image based on weights of blocks of the image, wherein the weights of the blocks are determined based on features of the image;
       present, using an interface, at least one of the image, the no-reference quality score, and a spatial quality map of the image, to the user;
       accept, using the interface, a user feedback towards validation of the no-reference quality score of the image;
       continually learn, using a learning model, user's perception of quality of the image based on processing of the image, the no-reference quality score determined by the PIQUE module, and the user feedback;
       adjust the no-reference quality score based on the user's perception of the quality of the image;

monitor deviations from the user's perception of the quality of the image and errors introduced during the continuous learning; and retain, using an image retaining module, the image while the no-reference quality score of the image lies between a predefined threshold range, else isolate the image for not to be retained.

11. The system of claim 10, wherein the no-reference quality score is determined while the processor is present in an idle mode.

12. The system of claim 10, wherein the no-reference quality score is determined by the PIQUE module using the relation, $$\text{Quality Score} = \left[\left(\sum_{k=0}^{N_{SA}} (D_{sk})\right) + C1/(C1 + N_{SA})\right],$$

wherein $D_{sk}$ is distortion assigned to a block of the image, $N_{SA}$ is number of spatially active blocks of the image.

13. The system of claim 10, wherein the no-reference quality score ranges from 0 to 1.

14. The system of claim 10, wherein the features comprise derivatives of standard deviation of edge segments of divisively normalized images.

15. The system of claim 10, wherein the user feedback is accepted while the system enters into an active mode from an idle mode.

16. The system of claim 10, wherein the user feedback is a score ranging from 1 to 5.

17. The system of claim 10, wherein the learning model continually learns the user's perception of the quality of the image based on training data generated from user's feedbacks towards quality of a plurality of images comprising dissimilar data content.

18. The system of claim 10, wherein the spatial quality map illustrates at least one of an amount and type of distortion or noise present in the blocks of the image.

19. A non-transient computer-readable medium comprising instructions for causing a programmable processor to:

receive an image from one of a camera and an archive of images;

determine a no-reference quality score of the image based on weights of blocks of the image, wherein the weights of the blocks are determined based on features of the image;

present to the user, at least one of the image, the no-reference quality score, and a spatial quality map of the image;

accept a user feedback towards validation of the no-reference quality score of the image;

continually learn user's perception of quality of the image based on processing of the image, the no-reference quality score determined by a Perception based Image Quality Evaluator (PIQUE) module, and the user feedback;

adjust the no-reference quality score based on the user's perception of the quality of the image;

monitor deviations from the user's perception of the quality of the image and errors introduced during the continuous learning; and retain the image while the no-reference quality score of the image lies between a predefined threshold range, else isolate the image for not to be retained.

* * * * *